United States Patent
Eichinger et al.

(10) Patent No.: US 8,614,528 B2
(45) Date of Patent: Dec. 24, 2013

(54) ELECTRIC MACHINE HAVING RADIAL DIVIDERS FOR GUIDING COOLING AIR

(75) Inventors: Benjamin Eichinger, Nürnberg (DE);
Thomas Hümer, Nürnberg (DE);
Jürgen Labermeier, Schwanstetten (DE); Carsten Mauss, Burglengenfeld (DE); Josef Niedermeyer, Hilpoltstein (DE); Ekkehard Ressel, Heilsbronn (DE); Sebastian Weiss, Oberasbach (DE)

(73) Assignee: Siemens Aktiengesellschaft, München (DE)

( * ) Notice: Subject to any disclaimer, the term of this patent is extended or adjusted under 35 U.S.C. 154(b) by 137 days.

(21) Appl. No.: 13/055,343

(22) PCT Filed: Jul. 8, 2009

(86) PCT No.: PCT/EP2009/058646
§ 371 (c)(1),
(2), (4) Date: Jan. 21, 2011

(87) PCT Pub. No.: WO2010/018033
PCT Pub. Date: Feb. 18, 2010

(65) Prior Publication Data
US 2011/0127862 A1    Jun. 2, 2011

(30) Foreign Application Priority Data
Jul. 21, 2008   (DE) .......................... 10 2008 033 959

(51) Int. Cl.
*H02K 9/00*   (2006.01)
*H02K 9/26*   (2006.01)
*H02K 9/08*   (2006.01)

(52) U.S. Cl.
USPC ................... 310/61; 310/56; 310/57; 310/59

(58) Field of Classification Search
USPC ................. 310/59, 52, 55–57, 60 R
See application file for complete search history.

(56) References Cited

U.S. PATENT DOCUMENTS 4,119,873 A  * 10/1978 Sakurai .......................... 310/56
4,442,371 A      4/1984 Murayama
(Continued)

FOREIGN PATENT DOCUMENTS

DE          30 15 435 A1    10/1980
DE          43 31 243 A1    3/1995
(Continued)

OTHER PUBLICATIONS

Machine Trnaslation JP10201177 (1998).*

*Primary Examiner* — Tran Nguyen
*Assistant Examiner* — Jose Gonzalez Quinones
(74) *Attorney, Agent, or Firm* — Henry M Feiereisen LLC

(57) ABSTRACT

An electric machine has a housing, a rotor shaft mounted in the housing, a rotor laminate stack arranged on the rotor shaft and having axial cooling channels and radial cooling channels, and a stator laminate stack having radial cooling channels which are open radially inwards and radially outwards and interact with the radial cooling channels of the rotor laminate stack. The housing has a lateral surface to delimit the housing interior in a radial direction and radial dividers arranged between end windings of the stator winding and the axial ribs, when viewed in the radial direction, and are spaced in the radial direction from the lateral surface delimiting the housing interior and forming tangential cooling air channels for the cooling air.

3 Claims, 3 Drawing Sheets

(56) References Cited

U.S. PATENT DOCUMENTS

| | | | |
|---|---|---|---|
| 4,443,723 A * | 4/1984 | Ohkubo | 310/53 |
| 6,680,549 B2 | 1/2004 | Boardman et al. | |
| 2006/0076841 A1 * | 4/2006 | Kreitzer | 310/59 |

FOREIGN PATENT DOCUMENTS

| | | |
|---|---|---|
| DE | 10 2004 016 465 A1 | 11/2005 |
| EP | 0 118 802 B1 | 5/1986 |
| EP | 0 291 918 A2 | 11/1988 |
| JP | 48 099606 A | 12/1973 |
| JP | 56 066155 A | 6/1981 |
| JP | 10201177 A * | 7/1998 |
| JP | 2001 008410 A | 1/2001 |
| JP | 2001078391 A * | 3/2001 |
| RU | 2101836 C1 | 1/1998 |
| RU | 37281 U1 | 4/2004 |
| RU | 2298276 C2 | 4/2007 |
| SU | 1185497 A1 | 10/1985 |
| SU | 1725322 A1 | 4/1992 |

* cited by examiner

ELECTRIC MACHINE HAVING RADIAL DIVIDERS FOR GUIDING COOLING AIR

CROSS-REFERENCES TO RELATED APPLICATIONS

This application is the U.S. National Stage of International Application No. PCT/EP2009/058646, filed Jul. 8, 2009, which designated the United States and has been published as International Publication No. WO 2010/018033 and which claims the priority of German Patent Application, Serial No. 10 2008 033 959.8, filed Jul. 21, 2008, pursuant to 35 U.S.C. 119(a)-(d).

BACKGROUND OF THE INVENTION

The present invention relates to an electric machine.

Electric machines are generally known.

The known electrical machine has a housing. In the housing a rotor shaft is mounted in bearings such that it is capable of rotating about a shaft axis. The housing has two end faces and a lateral surface. The housing axially delimits a housing interior with the end faces. The housing radially delimits the housing interior with the lateral surface. A rotor laminate stack is arranged on the rotor shaft in a manner fixed against rotation. The rotor laminate stack has axially running cooling channels and radially running cooling channels. The radially running cooling channels of the rotor laminate stack are open radially outwards and extend radially inwards at least as far as the axially running cooling channels. The housing has two axial dividers, which extend radially inwards starting from the lateral surface, but end in front of the rotor shaft. The axial dividers are arranged between the rotor laminate stack and the end faces, when viewed in the axial direction. The housing has axial ribs, which are arranged so as to be distributed over the circumference of the lateral surface, run axially at least between the axial dividers and extend radially inwards. They bear a stator laminate stack. The stator laminate stack interacts electrically with the rotor laminate stack. The stator laminate stack has radially running cooling channels, which are open radially inwards and radially outwards and interact with the radially running cooling channels of the rotor laminate stack. The stator laminate stack bears a stator winding. The stator winding has end windings, which protrude axially on both sides out of the stator laminate stack. The axial dividers extend radially inwards to such an extent that they overlap the end windings, when viewed in the radial direction.

The lateral surface has, in a first tangential region, two inlet openings and an outlet opening for cooling air. The inlet openings are arranged between in each case one of the end faces and in each case one of the axial dividers, when viewed in the axial direction. The outlet opening is arranged between the axial dividers, when viewed in the axial direction.

In the electric machine from the prior art, the cooling air is introduced into the rotor laminate stack axially from both sides. The cooling air flows first through the rotor laminate stack and then through the stator laminate stack. The cooling air emerges radially outwards from the stator laminate stack. Then the cooling air either emerges on the outside directly via the outlet opening or flows axially into a region in which the end windings are arranged. There, the cooling air flows tangentially until it reaches the first tangential region. There, the cooling air flows through the outlet opening and emerges from the electric machine.

A second proportion of the cooling air does not flow through the rotor laminate stack but directly through the end windings. This proportion of the cooling air emerges directly radially outwards after flowing through the end windings and is mixed with the first proportion of cooling air. Sometimes, the first and second proportions of cooling air impede one another in this process.

It is known in the prior art to accept that the proportions of cooling air will impede one another in this way and to swallow the decreased utilization of the electric machine associated therewith. It is furthermore known to use relatively strong fans which bring about a correspondingly large cooling air flow. It is furthermore known to use completely different cooling air guides.

SUMMARY OF THE INVENTION

The object of the present invention consists in configuring an electric machine of the type mentioned at the outset in such a way that more effective air guidance can be achieved whilst maintaining the basic design.

The object is achieved by an electric machine having a housing, wherein a rotor shaft is mounted in the housing such that it is capable of rotating about a shaft axis, wherein the housing has two ends faces, with which the housing axially delimits a housing interior, wherein the housing has a lateral surface, with which the housing radially delimits the housing interior, wherein a rotor laminate stack is arranged on the rotor shaft, wherein the rotor laminate stack has axially running cooling channels and radially running cooling channels, wherein the radially running cooling channels of the rotor laminate stack are open radially outwards and extend radially inwards at least as far as the axially running cooling channels, wherein the housing has two axial dividers, which extend radially inwards starting from the lateral surface, but end in front of the rotor shaft, wherein the axial dividers are arranged between the rotor laminate stack and the end faces, when viewed in the axial direction, wherein the housing has axial ribs, which are arranged so as to be distributed over the circumference of the lateral surface, run axially at least between the axial dividers and extend radially inwards, wherein the axial ribs bear a stator laminate stack, which interacts electrically with the rotor laminate stack, wherein the stator laminate stack has radially running cooling channels, which are open radially inwards and radially outwards and interact with the radially running cooling channels (9) of the rotor laminate stack, wherein the stator laminate stack bears a stator winding, wherein the stator winding has end windings, which protrude axially on both sides out of the stator laminate stack, wherein the axial dividers extend radially inwards to such an extent that they overlap the end windings, when viewed in the radial direction, wherein the lateral surface has, in a first tangential region, two inlet openings and an outlet opening for cooling air, wherein the inlet openings are arranged between in each case one of the end faces and in each case one of the axial dividers, when viewed in the axial direction, wherein the outlet opening is arranged between the axial dividers, when viewed in the axial direction, wherein the housing has two radial dividers, wherein the radial dividers are arranged between the end windings and the axial ribs, when viewed in the radial direction, extend from the stator laminate stack as far as in each case one of the axial dividers, when viewed in the axial direction, and, when viewed in the tangential direction, extend over a second tangential region, which is substantially complementary to the first tangential region. In addition to the features mentioned at the outset, the invention provides that the housing has two radial dividers which are arranged between the end windings of the stator winding and of the axial ribs, when viewed in the radial direction. The radial dividers extend from the stator laminate stack as far as in each case one of the axial dividers, when viewed in the axial direction, and, when viewed in the tangential direction, over a second tangential region, which is substantially complementary to the first tangential region.

The electric machine according to the invention can have a different configuration.

It is possible, for example, for the axial dividers to have radially inner ends, which are arranged further radially inwards than the end windings, when viewed in the radial direction, and terminating rings, which extend towards the stator laminate stack, when viewed in the axial direction, but are spaced apart from the stator laminate stack, are arranged at the radially inner ends of the axial dividers.

As an alternative or in addition to the first-mentioned configuration, it is possible for fans to be arranged on the rotor shaft in the region of the axial dividers.

As an alternative or in addition to one of the two (or both) abovementioned configurations, it is possible for the axial ribs to have a smaller radial extent in the region of the radial dividers than in the region of the stator laminate stack.

Further advantages and details are given in the description below relating to exemplary embodiments in conjunction with the drawings, in which, in the form of basic illustrations:

DETAILED DESCRIPTION OF PREFERRED EMBODIMENTS

Figure 1:
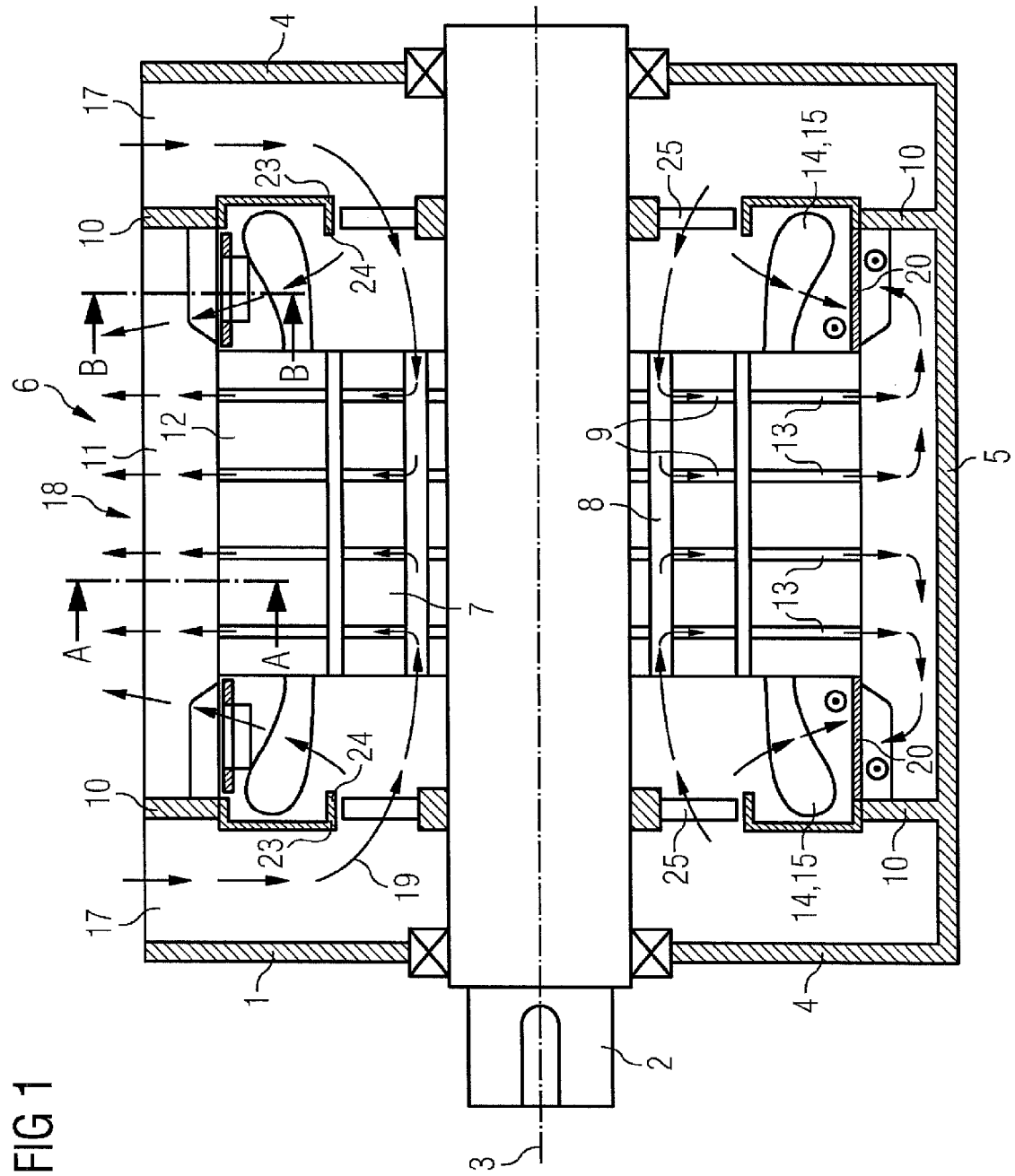
FIG. 1 shows a longitudinal section through an electric machine according to the invention.
Figure 2:
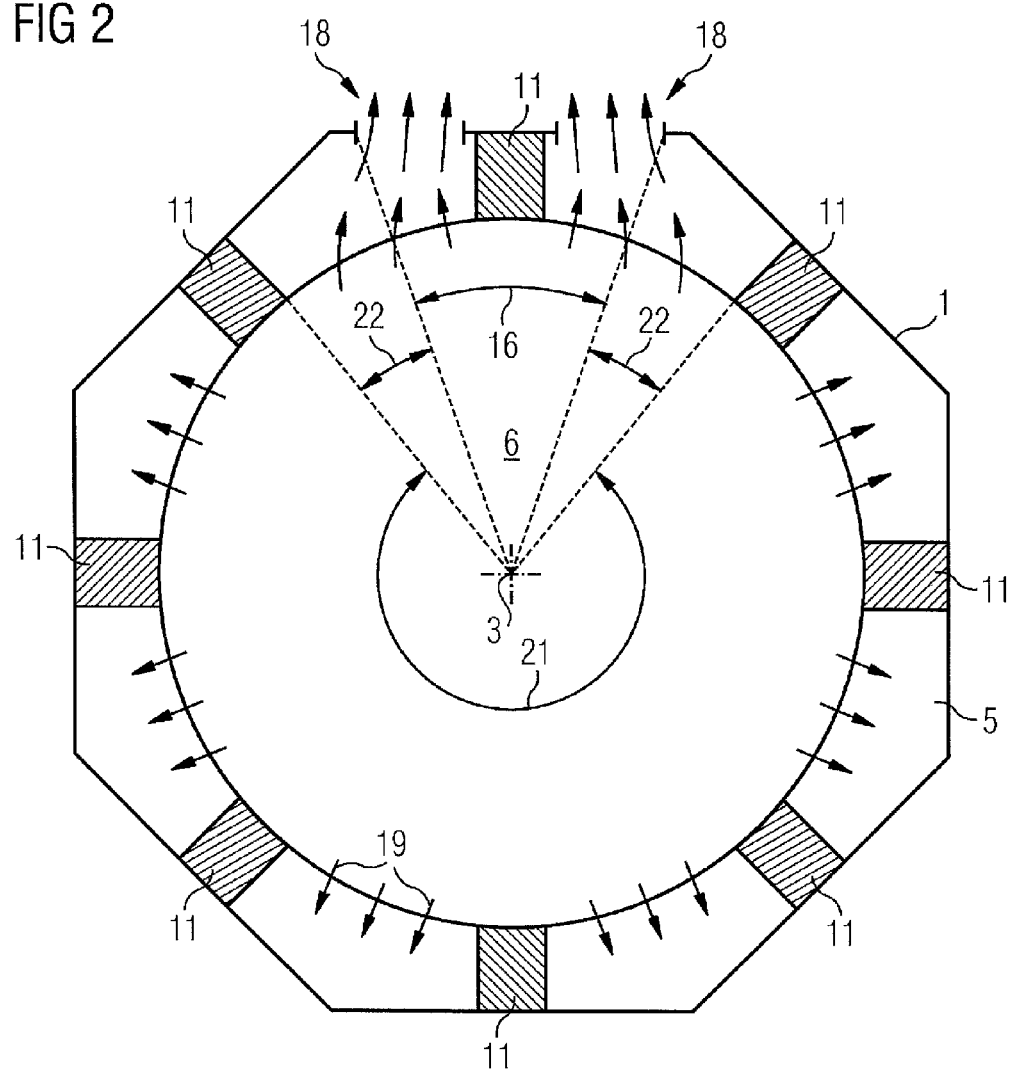
FIG. 2 shows a section along a line A-A in FIG. 1.
Figure 3:
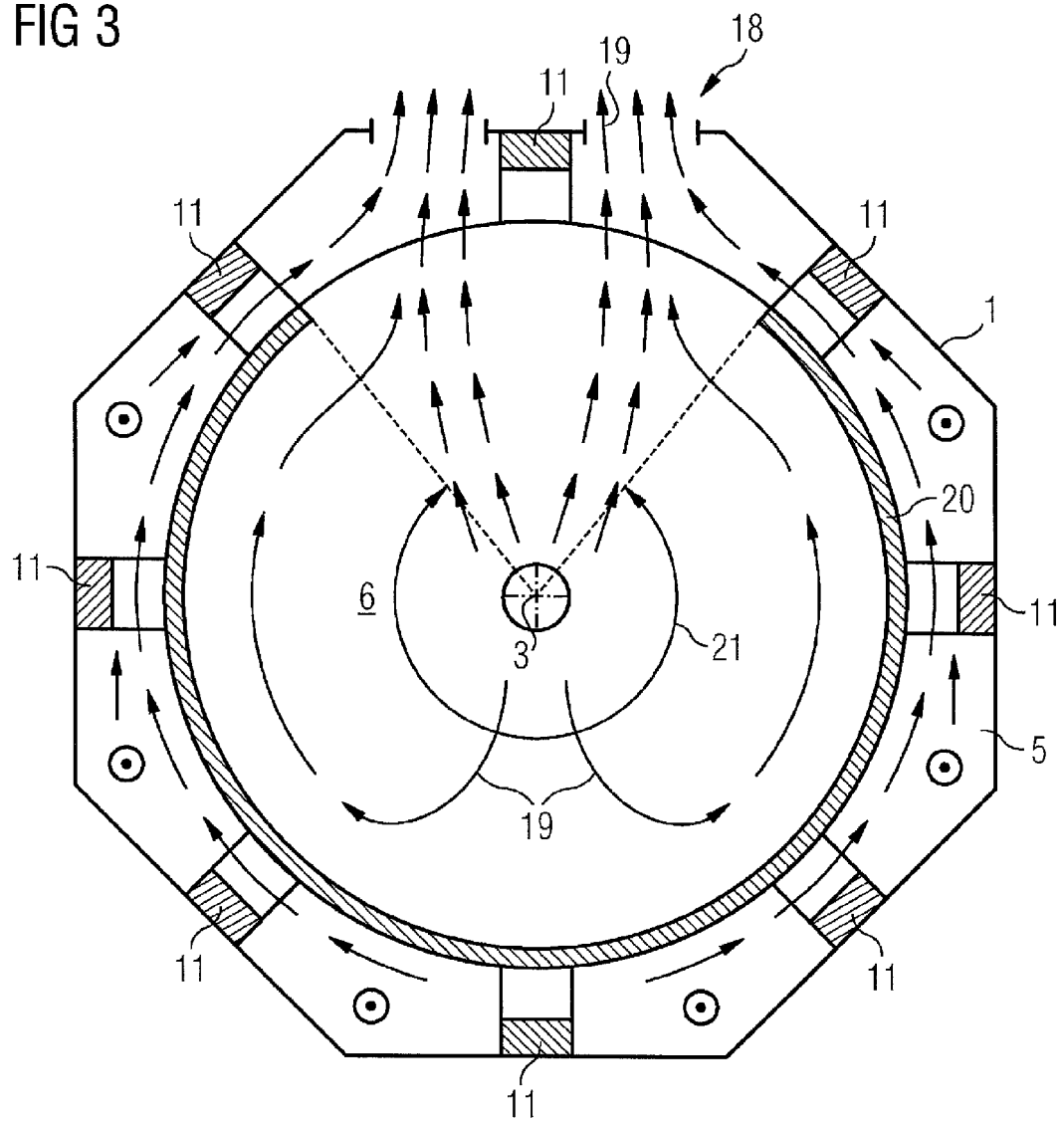
FIG. 3 shows a section along a line B-B in FIG. 1.

FIGS. 1 to 3 will be explained together below since they show the same electric machine. First, the basic principle of the present invention and the way in which the invention works will be explained, followed by possible configurations.

As shown in FIGS. 1 to 3, an electric machine has a housing 1. A rotor shaft 2 is mounted in the housing 1 such that it is capable of rotating about a shaft axis 3. In general, it is mounted in bearings. The bearings are often in the form of roller bearings, for example in the form of ball bearings. However, the bearings can also have a different design, for example be in the form of cylindrical or tapered bearings or in the form of active or passive magnetic bearings.

Insofar as the terms "axial", "radial" and "tangential" are used below, these terms always refer to the shaft axis 3. In this case, the term "axial" means a direction parallel to the shaft axis 3. The term "radial" means a direction orthogonal to the axial direction, namely towards the shaft axis 3 or away from the shaft axis 3. The term "tangential" denotes a direction orthogonal to the axial direction and orthogonal to the radial direction, i.e. at a radial distance from the shaft axis 3 about the shaft axis 3.

The housing 1 has two end faces 4 and a lateral surface 5. The housing 1 axially delimits a housing interior 6 with the end faces 4. The housing 1 radially delimits the housing interior 6 with the lateral surface 5.

A rotor laminate stack 7 is arranged on the rotor shaft 2 in a manner fixed against rotation. The rotor laminate stack 7 has axially running cooling channels 8 and radially running cooling channels 9. The axially running cooling channels 8 can be arranged in the vicinity of the rotor shaft 2. The radially running cooling channels 9 of the rotor laminate stack 7 are open radially outwards and extend radially inwards at least as far as the axially running cooling channels 8. The radially running cooling channels 9 can extend radially inwards over the axially running cooling channels 8 of the rotor laminate stack 7, corresponding to the illustration, in FIG. 1. However, this is not absolutely necessary. It is sufficient if the radial cooling channels 9 of the rotor laminate stack 7 extend as far as the axially running cooling channels 8. The rotor shaft 2 and the rotor laminate stack 7 are not included in the illustrations in FIGS. 2 and 3 in order not to overload FIGS. 2 and 3.

If the radially running cooling channels 9 of the rotor laminate stack 7 extend radially inwards beyond the axially running cooling channels 8, the degree to which the extent goes beyond the axially running cooling channels 8 is in principle freely selectable. In particular, the radially running cooling channels 9 of the rotor laminate stack 7 can alternatively extend as far as the rotor shaft 2 or end at a radial distance in front of the rotor shaft 2.

The housing 1 has two axial dividers 10, which extend radially inwards starting from the lateral surface 5, but end in front of the rotor shaft 2. The axial dividers 10 are arranged between the rotor laminate stack 7 and the end faces 4, when viewed in the axial direction. The axial dividers 10 are closed, when viewed in the tangential direction, i.e. run all the way round. This can be seen particularly clearly from FIGS. 2 and 3. The axial dividers 10 are furthermore characterized by the addition "axial" because they divide different axial regions of the electric machine with respect to one another in terms of flow.

The housing 1 has axial ribs 11, which are arranged so as to be distributed over the circumference of the lateral surface 5. The axial ribs 11 run axially at least between the axial dividers 10 and extend radially inwards. The axial ribs 11 bear a stator laminate stack 12. The stator laminate stack 12 interacts electrically with the rotor laminate stack 7. The stator laminate stack 12 has radially running cooling channels 13. The radially running cooling channels 13 of the stator laminate stack 12 are open radially inwards and radially outwards. They interact with the radially running cooling channels 9 of the rotor laminate stack 7. The stator laminate stack is not included in the illustrations in FIGS. 2 and 3 either.

The stator laminate stack 12 bears a stator winding 14. The stator winding 14 has end windings 15, which protrude axially on both sides out of the stator laminate stack 12. The axial dividers 10 extend radially inwards to such an extent that they overlap the end windings 15, when viewed in the radial direction.

As shown in FIGS. 2 and 3, the lateral surface 5 has, in a first tangential region 16, two inlet openings 17 and an outlet opening 18 for cooling air 19. The inlet openings 17 are arranged between in each case one of the end faces 4 and in each case one of the axial dividers 10, when viewed in the axial direction. The outlet opening 18 is arranged between the axial dividers 10, when viewed in the axial direction.

The housing 1 has two radial dividers 20, which are arranged between the end windings 15 of the stator winding 14 and the axial ribs 11, when viewed in the radial direction. They extend from the stator laminate stack 12 towards in each case one of the axial dividers 10, when viewed in the axial direction, and, when viewed in the tangential direction, over a second tangential region 21, which is substantially complementary to the first tangential region 16. The radial dividers 20 are in this case characterized by the addition "radial" because they divide different regions of the electric machine with respect to one another, when viewed in the radial direction.

In general, the first tangential region 16 has no region of overlap with the second tangential region 20. In this case, it is possible for the first tangential region 16 and the second tangential region 21 to supplement one another to form a full circle. Often, however, two residual tangential regions 22 remain. If the residual tangential regions 22 are provided, they are generally of equal size. However, in exception cases, they may also have different sizes. It is also possible for only one of the two residual tangential regions 22 to be provided.

The radial dividers 20 extend at least as far as the two axial ribs 11, which directly adjoin the first tangential region 16, as shown in FIG. 3. In accordance with the exemplary embodiment in which eight axial ribs 11 are provided and the first tangential region 16 overlaps one of the axial ribs 11, the following numerical values are therefore applicable: the first tangential region 16 overlaps by a maximum of 90°, when viewed in the tangential direction, around 45° in accordance with the exemplary embodiment. The second tangential region 21 overlaps by at least 270°. This is also illustrated in this way in the exemplary embodiment.

If the first tangential region 16 were not to overlap any of the axial ribs 11, the first tangential region 16 would extend between two axial ribs 11 and therefore overlap them by a maximum of 45°. The second tangential region 21 would in this case overlap by at least 315°.

The tangential extent of the axial ribs 11 has not been taken into consideration in the above numerical values. Owing to the tangential extent of the axial ribs 11, slightly different numerical values may result in practice.

The text which follows explains how the electric machine in FIGS. 1 to 3 is cooled.

During operation of the electric machine, the rotor shaft 2 rotates about the shaft axis 3. The cooling air 19 is sucked in via the inlet openings 17. A first proportion of the cooling air 19 first flows through the axially running cooling channels 8 of the rotor laminate stack 7, and then the radially running cooling channels 9 of the rotor laminate stack 7 and finally the radially running cooling channels 13 of the stator laminate stack 12.

If the first proportion of cooling air 19 emerges from the stator laminate stack 12, it emerges either in the first tangential region 16 or outside the first tangential region 16. If it emerges outside the first tangential region 16, the cooling air 19 must first flow axially with respect to the axial regions in which the end windings 15 are located. There, the relevant proportion of cooling air 19 flows tangentially until it reaches the first tangential region 16. Then, the cooling air 19 flows towards the outlet opening 18. From there, it emerges radially outwards from the electric machine.

A second proportion of the cooling air 19 first flows through the end windings 15. In this case, it can flow through alternatively in the second tangential region 21 or outside the second tangential region 21. If it flows through outside the second tangential region 21, the relevant proportion of the cooling air 19 flows directly radially outwards and continues to flow via the outlet opening 18 out of the electric machine. Prior to leaving the electric machine, in the process it mixes with the first proportion of the cooling air 19 which has previously flowed tangentially to the first tangential region 16.

If the second proportion of the cooling air 19 passes through the end windings 15 within the second tangential region 21, the corresponding proportion of the cooling air 19 is deflected by the radial dividers 20 in the tangential direction, with the result that the corresponding proportion of the cooling air 19 first flows tangentially along the radial dividers 20 until it leaves the second tangential region 21. Only then does it mix with the first proportion of the cooling air 19. The radial dividers 20 therefore ensure that the first and second proportions of the cooling air 19 cannot be mixed with one another until outside the second tangential region 21, in which they have substantially the same direction of flow. The corresponding proportions of the cooling air 19 can therefore not impede one another, for which reason more efficient cooling of the electric machine is possible.

The above-explained basic principle of the present invention can be configured in different ways. In this case, the configurations are also illustrated in FIGS. 1 to 3. In principle, the electric machine according to the invention can also be implemented without these configurations, however. Furthermore, the configurations explained in combined form below can be implemented independently of one another, i.e. individually, in pairs or together.

In a first configuration, the axial dividers 10 have radially inner ends 23. The radially inner ends 23 are arranged further radially inwards than the end windings 15, when viewed in the radial direction. Terminating rings 24 are arranged on the radially inner ends 23 of the axial dividers 10. The terminating rings 24 extend towards the stator laminate stack 12, when viewed in the axial direction. However, they are spaced apart from the stator laminate stack 12. This configuration results in improved air guidance. In particular, it prevents a notable proportion of the cooling air 19 from flowing past the end windings 15 at a distance which is too great, with the result that it does not contribute to the cooling of the electric machine.

The degree to which the terminating rings 24 extend towards the stator laminate stack 12 should not be too great. In general, the degree should be at most 20% of the axial distance of the axial dividers 10 from the stator laminate stack 12. Furthermore, the axial extent of the terminating rings 24 is generally at most 15% of the degree to which the end windings 15 project beyond the stator laminate stack 12 axially.

In a second possible configuration, fans 25 are arranged on the rotor shaft 2 in the region of the axial dividers 10. This configuration makes it possible to achieve active and intensified delivery of the cooling air 19 and therefore improved cooling performance.

In a further preferred configuration, the axial ribs 11 have a smaller radial extent in the region of the radial dividers 20 than in the region of the stator laminate stack 12. This measure results in a configuration of the electrical machine which has a simpler design.

By means of the electric machine according to the invention, improved cooling of the electric machine is possible whilst maintaining a tried and tested air flow principle. The electric machine can therefore be operated at a higher permanent rated power or peak rated power than in the prior art given an otherwise unchanged design.

The above description is used exclusively for explaining the present invention. The scope of protection of the present invention should, however, be defined exclusively by the attached claims.

The invention claimed is:

1. An electric machine, comprising:
a housing having two end faces to delimit a housing interior in an axial direction and a lateral surface to delimit the housing interior in a radial direction, said housing having axial ribs spaced about a circumference of the lateral surface, said lateral surface having a first tangential region provided with two inlet openings and an outlet opening for cooling air;
a rotor shaft mounted in the housing for rotation about a shaft axis;

a rotor laminate stack arranged on the rotor shaft and having axial cooling channels and radial cooling channels, said radial cooling channels being open radially outwards and sized to extend radially inwards at least to the axial cooling channels;

a stator laminate stack supported by the axial ribs and interacting electrically with the rotor laminate stack, said stator laminate stack having radial cooling channels which are open radially inwards and radially outwards and interact with the radial cooling channels of the rotor laminate stack, said stator laminate stack supporting a stator winding having end windings which protrude axially on both sides out of the stator laminate stack;

two axial dividers arranged between the rotor laminate stack and the end faces of the housing, when viewed in the axial direction, and extending radially inwards from the lateral surface to end at a distance to the rotor shaft and to overlap the end windings, when viewed in the radial direction; and two radial dividers arranged in the housing between the end windings and the axial ribs, when viewed in the radial direction, said radial dividers extending from the stator laminate stack to the axial dividers, respectively, when viewed in the axial direction, and, when viewed in a tangential direction, extending over a second tangential region, which is free of overlap with respect to the first tangential region, said first and second tangential regions jointly defining with a maximum of two residual tangential regions a full circle, said radial dividers spaced in the radial direction from the lateral surface delimiting the housing interior and forming tangential cooling air channels for the cooling air, which extend tangentially along the second tangential region and join the outlet opening for the cooling air disposed in the first tangential region, wherein the axial ribs extend axially at least between the axial dividers and radially inwards, said axial ribs defined a radial extent which is smaller in a region of the radial dividers than in a region of the stator laminate stack, wherein, when viewed in the axial direction, one of the inlet openings in the lateral surface is arranged between one of the end faces and the adjacent one of the axial dividers, and the other one of the inlet openings in the lateral surface is arranged between the other one of the end faces and the adjacent one of the axial dividers, and wherein the outlet opening of the lateral surface is arranged between the axial dividers, when viewed in the axial direction.

2. The electric machine of claim 1, wherein the axial dividers have radially inner ends arranged radially inwards of the end windings, when viewed in the radial direction, and further comprising terminating rings arranged at the radially inner ends of the axial dividers and extending, when viewed in the axial direction, towards the stator laminate stack at a distance thereto.

3. The electric machine of claim 1, further comprising fans arranged on the rotor shaft in a region of the axial dividers.

* * * * *